(12) United States Patent
Kan et al.

(10) Patent No.: US 7,313,141 B2
(45) Date of Patent: Dec. 25, 2007

(54) PACKET SEQUENCE NUMBER NETWORK MONITORING SYSTEM

(75) Inventors: Chao Kan, Plano, TX (US); Pierrick Guingo, Dallas, TX (US); Emanuele Jones, Ottawa (CA); Hubert Ogier, Paris (FR); Thierry Labbe, Dallas, TX (US)

(73) Assignee: Alcatel Lucent, Paris (FR)

( * ) Notice: Subject to any disclaimer, the term of this patent is extended or adjusted under 35 U.S.C. 154(b) by 1084 days.

(21) Appl. No.: 10/267,813

(22) Filed: Oct. 9, 2002

(65) Prior Publication Data

US 2004/0073655 A1    Apr. 15, 2004

(51) Int. Cl.
H04L 12/28 (2006.01)
H04L 12/56 (2006.01)

(52) U.S. Cl. .................. 370/394; 370/474
(58) Field of Classification Search ........ 370/238, 370/254, 229–235, 255, 395.31, 394, 389, 370/94.1, 392, 465, 474; 395/200.54, 200.61; 714/746, 748, 749, 750
See application file for complete search history.

(56) References Cited

U.S. PATENT DOCUMENTS

| 5,151,899 A | * | 9/1992 | Thomas et al. ............. 370/394 |
| 5,933,602 A | * | 8/1999 | Grover ........................ 709/224 |
| 6,587,438 B1 | * | 7/2003 | Brendel ...................... 370/238 |
| 2003/0016627 A1 | * | 1/2003 | MeLampy et al. .......... 370/235 |

FOREIGN PATENT DOCUMENTS

EP      1 111 871 A2  *  6/2001

OTHER PUBLICATIONS

Takeo Saitoh et al., "Network Congestion Monitoring and Detection using the IMI Infrastructure", 1999, International Conference on Parallel Processing; Sep. 21-24, 1999, pp. 462-469; IEEE.*
Saitoh, et al.; Network Congestion Monitoring and Detection Using the IMI Infrastructure; 1999 International Conference on Parallel Processing; Sep. 21-24, 1999; pp. 462-469; IEEE.
Brownlee, et al; Traffic Flow Measurement: Architecture; IETF RFC 2063; Jan. 1997; pp. 1-32.
NLANR; TCP Trace Based Performance Diagnosis Flowchart; NLANR: Engineering Services; Dec. 1, 1999.

* cited by examiner

Primary Examiner—Ajit Patel
(74) Attorney, Agent, or Firm—Anderson, Levine & Lintel; Bobby D. Slaton

(57) ABSTRACT

A network monitoring system (60). The system comprises storage circuitry (32) for storing network packet information, wherein the network packet information includes a predicted identifier. The network monitoring system also comprises at least one monitoring circuit (36) coupled to a network (70) along which network traffic flows in a form of packets. The at least one monitoring circuit programmed to perform the steps (44) of receiving a packet communicated along the network and determining whether the received packet is communicated between a source and destination in a first set of network nodes. Each packet in a sequence of communications between the source and the destination comprises a packet identifier that uniquely identifies the packet from all other communications in a flow between the source and the destination. The at least one monitoring circuit programmed to perform the step of, responsive to determining the received packet is communicated between a source and destination in the first set of network nodes, comparing the packet identifier of the received packet to the predicted identifier to determine an identifier deviation between the packet identifier and the predicted identifier for identifying an irregularity in the network traffic.

35 Claims, 4 Drawing Sheets-

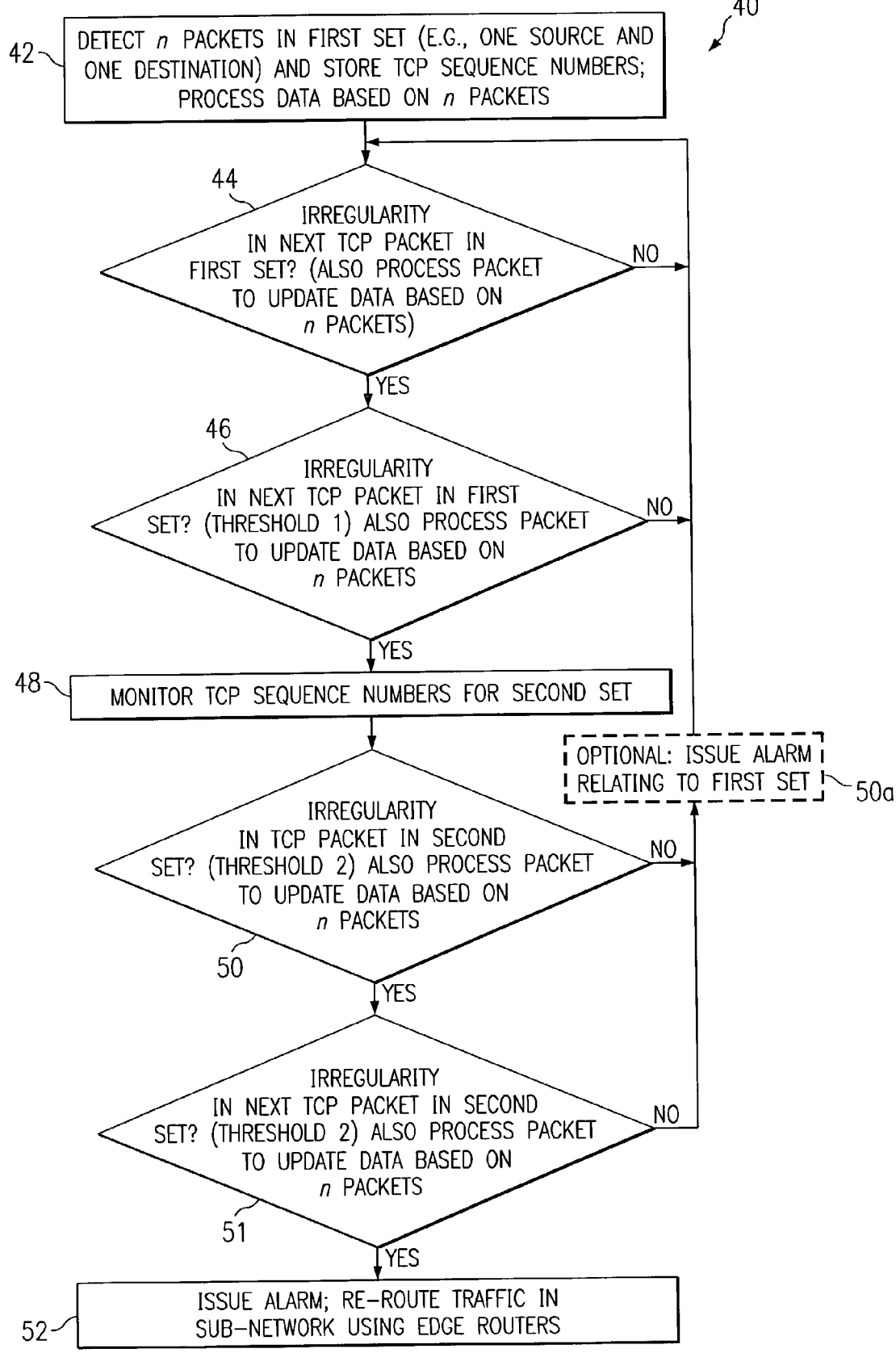

PACKET SEQUENCE NUMBER NETWORK MONITORING SYSTEM

CROSS-REFERENCES TO RELATED APPLICATIONS

Not Applicable.

STATEMENT REGARDING FEDERALLY SPONSORED RESEARCH OR DEVELOPMENT

Not Applicable.

BACKGROUND OF THE INVENTION

The present embodiments relate to computer networks and are more particularly directed to a real-time system for monitoring network performance by evaluating packet identifiers such as packet sequence numbers.

As the number of users and traffic volume continue to grow on the internet and other networks, an essential need has arisen for both the users and network operators to have a set of mechanisms to monitor network performance, detect router availability, and troubleshoot network congestion without introducing additional traffic on the network. This is especially true for Internet Service Providers in order to comply with the Service Level Agreements ("SLAs") that they are now providing to customers. Additionally, such a need is prevalent for the underlying internet protocol ("IP") networks in the global internet. With these mechanisms, the users and network operators also can monitor and query the reliability and availability of the network nodes (e.g., IP routers) and the given internet paths, and the mechanisms also can identify the location of a segment of a given internet path, if any, that has a limitation. Additionally, the internet is evolving towards an advanced architecture that seeks to guarantee the quality of service ("QoS") for real-time applications, such as by putting limits on the upper bound on certain QoS parameters including jitter, throughput, one-way packet delay, and packet loss ratio. Accordingly, tracking QoS performance is also desirable. Given the preceding, various mechanisms for network monitoring have been developed in the art, some of which are described below.

A first type of network performance analysis mechanism is known in the art as an active mechanism. The active network performance monitoring system sends a series of special test packets or query packets to the underlying networks or routers, and it analyzes the response with a specific purpose. Currently, most tools for active end-to-end QoS monitoring in IP networks are based on the traditional "ping" (i.e., ICMP echo and echo response messages) to measure the roundtrip delay between two hosts. Variations of ping include "Nikhef ping," "fping," "pingplotter," "gnuplotping," "Imeter," and "traceping". Several other tools are variations based on the traditional "traceroute" (which exploits the time-to-live field in the IP packet header), for example, "Nikhef traceroute," "pathchar," "whatroute," and "network probe daemon." A few large-scale research projects are using "ping" to continually and actively monitor the network performance between various points in the global internet. Examples of these types of projects are: (i) the PingER project at Stanford Linear Accelerator Center ("SLAC") uses repeated pings around various Energy Sciences Network ("ESnet") sites; (ii) the Active Measurement Program ("AMP") project by National Laboratory for Applied Network Research ("NLANR") performs pings and traceroutes between various NSF-approved high-performance connection sites; (iii) the Surveyor project attempts one-way packet delay and loss measurements between various sites using the global positioning system ("GPS") for time synchronization; and (iv) the national Internet measurement infrastructure ("NIMI") project measures the performance between various sites using traceroute or transmission control protocol ("TCP") bulk transfer.

A second type of network performance analysis mechanism is known in the art as a passive mechanism and may be contrasted to the active mechanism discussed above. The passive network performance monitoring system performs its traffic analysis in a non-invasive way with respect to the observed networking environment, namely, the system does not introduce additional test packets to the network. As a result, the system does not affect the performance of the network while doing the measurements and querying. The traditional approach usually involves the following three steps: (i) collection of the entire TCP/IP packet (e.g. traffic sniffers, etc.) or the entire packet header data into a database or databases; (ii) hardware and software for analyzing the collected database(s); and (iii) off-line traffic characterization and modeling. Various examples of passive mechanisms have been implemented by certain entities. For example, the NLANR has been using OCXmon monitors to tap into the light of a fiber interconnection by means of optical splitters, and from the connection the system collects a portion of the packet, namely, the packet header. Specifically, traffic data is collected in an abstract format by extracting and storing the packet header in the database within a preset traffic aggregation period. The packet header traffic data in the database is later analyzed (i.e., an off-line traffic analysis). As another example, Cisco offers a NetFlow capability in its large routers. NetFlow identifies traffic flows based on IP source/destination addresses, protocol ID field, type of service ("TOS") field, and router port. Once identified, statistics can be collected for a traffic flow, and exported via user datagram protocol ("UDP") when the flow expires. Flow statistics may include the flow start/stop times, number of bytes/packets, and all IP header fields. As a final example, Lucent Bell Labs has various research projects in traffic analysis, which are mainly concentrated in collection of TCP/UDP/IP packet headers and off-line traffic analysis, modeling and visualization.

A third type of network performance analysis mechanism is also a type of passive mechanism in that it does not add traffic to the network, but rather than collecting information directly from a packet it instead collects statistics pertaining to the packet; this system is sometimes referred to as a network or element management system. In this system, instead of separately setting up the packet collection process, IP routers periodically (e.g., in 30 minute intervals) store and collect a set of traffic statistics into a built-in Management Information Base ("MIB") using a simple network management protocol ("SNMP") interface, and those statistics may be retrieved by a network or element manager. Typical traffic statistics might be the number of received/forwarded packets, discarded packets, error packets, port utilization, CPU utilization, buffer utilization, and so forth. As in other passive systems, these statistics are collected for later analysis. When a network congestion or event occurs, the SNMP agent embedded in the IP router sends a trap message to the SNMP manager, which then indicates an alarm in its graphic user interface.

While the preceding systems have provided certain levels of information about the behavior of traffic in IP networks, the present inventors have observed that such systems also provide various drawbacks. As an example of a drawback with respect to the active systems, they are required to send special test or PING packets and, thus, these additional packets themselves introduce additional traffic onto the route of the regular data packets. Accordingly, at the time of detecting the network congestion or server availability, the network performance and associated QoS being measured will be negatively impacted by this additional burden. Additionally, the QoS is measured for the test packets instead of the actual data packets, and the QoS for the data packets must be inferred indirectly from the QoS measured for the test packets. As an example of a drawback with respect to the passive system, although many traffic studies have attempted to understand the random behavior or composition of internet traffic, these traffic studies have been off-line analysis of historical data. There are no known prominent research projects attempting traffic analysis and control based on real-time traffic measurement or comprehensive traffic profiling. For example, Lucent's projects reflect the traditional approach of collecting large traffic measurement datasets for lengthy periods of time such as on the order of many days and then performing subsequent off-line statistical analysis. Cisco NetFlow essentially measures the volume and duration of each traffic flow for the purposes of accounting and off-line traffic analysis, but is not intended to be used for real-time network monitoring and querying. The OCXmon tool from NLANR is only for asynchronous transfer mode ("ATM") traffic, and is not for the purpose of traffic monitoring and control. Given the off-line use of these tools which, by definition, is delayed by some time which may be on the order of days, any conclusion that may be drawn from the collected data is stale in the sense that it applies to the network environment as it existed at some previous time rather than having a high likelihood of characterizing the network at the time the analysis is concluded; in other words, the status of the network is likely to have changed between the time these prior art systems collect their data and the time they drawn any inferences or conclusions during their off-line analysis. Thus, by time the results provide meaningful indicators, the real-time status of the network may have changed. Finally, as an example of a drawback of the element management system, the router MIB is usually designed based on the specific structure and implementation of the underlying network or IP router and, therefore, it will not be the same for equipment from different vendors. For example, the Argent Guardian tool from Argent Software Inc. for performance monitoring and proactive problem detection and correction has different versions for different monitored entities. The Argent Guardian for Cisco can only be used for Cisco routers because it uses the Cisco router MIB to retrieve and query the traffic information. In addition, the MIB is commonly embedded in the IP router. As a result of these constraints, there is considerable difficulty in changing the MIB once the design is complete. Accordingly, there are considerable barriers to the use of such a system in the instance where there is a change in the parameters or statistics to be monitored and where the change is not already built into the MIB.

In view of the above, there arises a need to address the drawbacks of the prior art as is accomplished by the preferred embodiments described below.

BRIEF SUMMARY OF THE INVENTION

In the preferred embodiment, there is a network monitoring system. The system comprises storage circuitry for storing network packet information, wherein the network packet information includes a predicted identifier. The network monitoring system also comprises at least one monitoring circuit coupled to a network along which network traffic flows in a form of packets. The at least one monitoring circuit is programmed to perform the steps of receiving a packet communicated along the network and determining whether the received packet is communicated between a source and destination in a first set of network nodes. Each packet in a sequence of communications between the source and the destination comprises a packet identifier that uniquely identifies the packet from all other communications in a flow between the source and the destination. The at least one monitoring circuit programmed to perform the step of, responsive to determining the received packet is communicated between a source and destination in the first set of network nodes, comparing the packet identifier of the received packet to the predicted identifier to determine an identifier deviation between the packet identifier and the predicted identifier for identifying an irregularity in the network traffic.

Other aspects are also described and claimed.

BRIEF DESCRIPTION OF THE SEVERAL VIEWS OF THE DRAWING

FIG. 7 illustrates a flow chart of the operation of each network monitor $NM_1$ through $NM_5$ of FIG. 5.

DETAILED DESCRIPTION OF THE INVENTION

Figure 1:
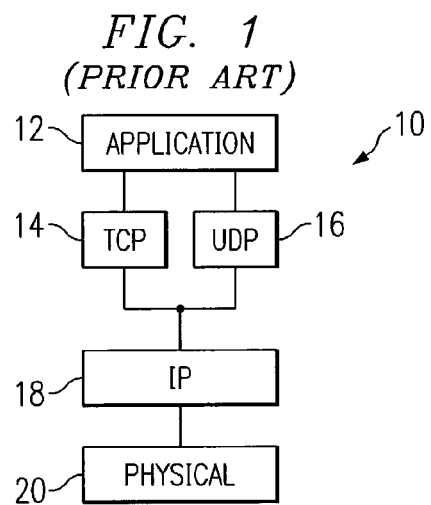
FIG. 1 illustrates a prior art network layer stack 10 defined to include the transmission control protocol ("TCP").

By way of introduction to one preferred inventive implementation, FIG. 1 illustrates a known prior art network layer stack 10 defined to include the internet connection protocol ("IP") as discussed below. At the top of stack 10 is an application layer 12, which typically represents one or more programs that are commonly used by consumers for various reasons, including personal and business computing. Beneath application layer 12 are located two protocol layers, namely, a transmission control protocol ("TCP") layer 14 and a user datagram protocol ("UDP") layer 16. TCP layer 14 is a connection-oriented layer, that is, once a connection is established from a source to a destination and through that layer, then traffic through that connection is confirmed so that if a packet is lost before it is confirmed by its destination then the source re-transmits the packet. In contrast, UDP layer 16 is connectionless and, thus, no confirmation is made as between a packet passing from a source to its destination; accordingly, if a packet is lost in a UDP communication then there is no re-transmission of that packet. Comparing then the TCP and UDP layers 14 and 16, TCP assures greater integrity of communications yet it requires greater overhead than UDP.

Below layers 14 and 16 is an IP layer 18, using IP as introduced above. Thus, both TCP and UDP network packets along a given network pass through the IP layer 18 and therefore also must comply with the requirements of the IP protocol. IP layer 18 is also a connectionless layer, although for TCP packets passing through the layer the connection-oriented nature of TCP layer 14 may be relied upon to provide additional data integrity. Due to the connectionless nature of IP layer 18, there is a trend in the networking art to provide measures of so-called quality of service ("QoS") in order to give priority or otherwise provide guidance to the flow of connectionless IP packets. In any event, and importantly for one example of the preferred embodiment as detailed in this document, each TCP (as opposed to UDP) network packet passing from a single source to a single destination and through IP layer 18 includes a unique TCP sequence number that thereby distinguishes that packet from all other TCP packets communicated from the source to the destination in a given flow session. This TCP sequence number is required as a TCP parameter and may be used for various purposes as known in the art, while the preferred embodiments further monitor the number to evaluate network performance as detailed below. Before reaching that discussion and completing the discussion of FIG. 1, located below IP layer 18 is a physical layer 20. Physical layer 20 is commonly associated with the physical hardware at a source or destination, as typically represented by a network interface having a media access control ("MAC") address.

As further explored below, the preferred embodiments evaluate network performance, preferably as it is reflected in communications between specified nodes such as in specified sub-networks in the network, in response to a real-time evaluation of the progression of TCP packet sequence numbers. In this regard, in part the evaluation by the preferred embodiments includes consideration of three prior art observations made by the NLANR as relating to TCP sequence numbers. These three observations are explored below in connection with FIGS. 2 through 4.

Figure 2:
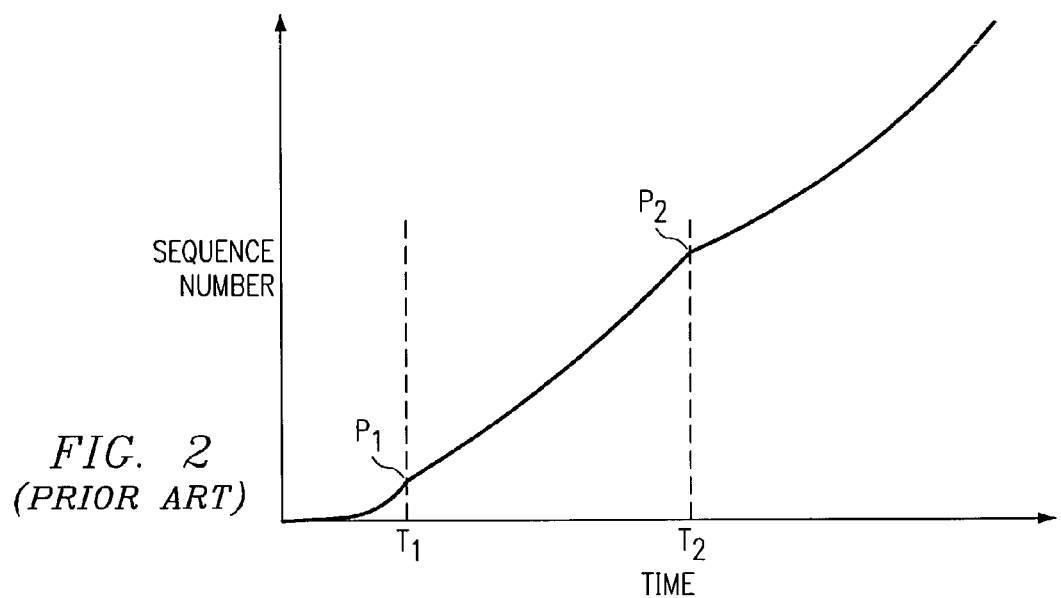
FIG. 2 illustrates a prior art plot of the evolution of TCP sequence numbers over time when a TCP session, including the source, destination, and network, behave normally.

FIG. 2 illustrates a plot of the evolution of TCP sequence numbers over time when a TCP session, including the source, destination, and network, behave normally. In FIG. 2, the horizontal axis represents the passage of time since the beginning of the TCP session observation, while the vertical axis represents the sequence number of the last byte of each data packet. Note that the sequence numbers are shown for simplicity of illustration to start from zero, whereas in reality they typically commence from a non-zero, and likely random, number, and then increase from that point. In any event, the sequence numbers will increase monotonically unless there are reordered or retransmitted packets. While intuitively one might expect a linear relationship for normal behavior, instead note that the plot provides a number of upward curves each ending with a peak, such as shown by ways of example with a curve prior to a point $P_1$ at time $t_1$ and a point $P_2$ at a time $t_2$. Note that these curves, followed by respective peaks, occur under ideal network operation because the source transmission rate will tend to increase toward and reach the normal upper limit of the traffic rate for the destination (or the network). In other words, under TCP protocol, transmission occurs in a TCP control window, where the source starts transmitting at a certain rate, and hence with a corresponding steady increase in TCP sequence numbers, followed by an attempt within the window over time to increase the transmission rate and hence with a change in the rate of the ascension of the TCP sequence numbers. The source's periodic attempts during the TCP control window to increase the TCP sequence number frequency continues until the limit of the destination (or network) to accurately communicate packets is reached. As this limit is reached, the source will reduce its transmission rate for a time and thereafter again continue to increase it until the limit is again reached later in time.

Figure 3:
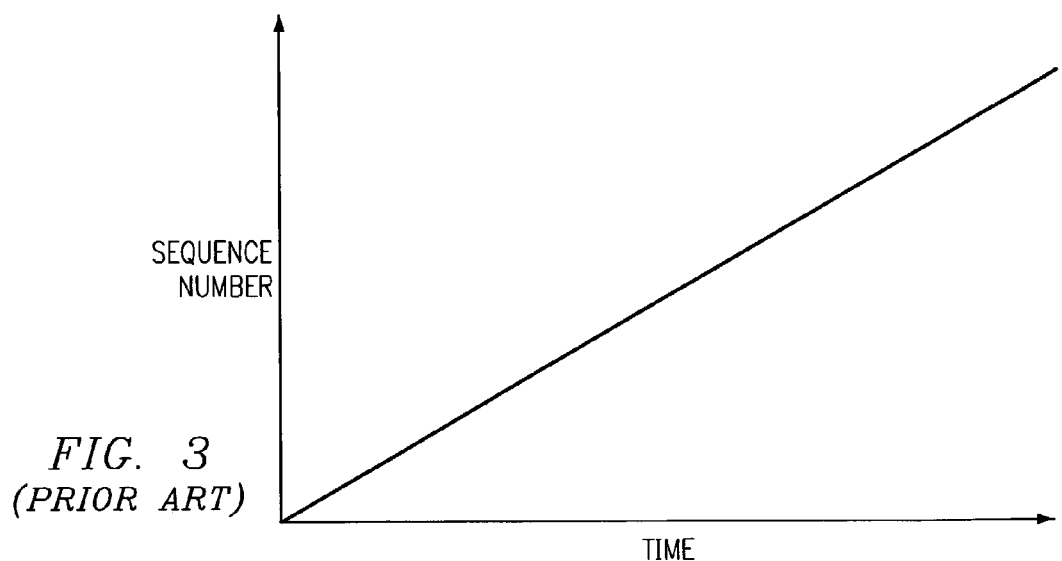
FIG. 3 illustrates a prior art plot of the evolution of TCP sequence numbers over time when during a TCP session the network operates normally but either the source or destination is limiting the bandwidth of communication.

FIG. 3 illustrates a plot of the evolution of TCP sequence numbers over time, when during a TCP session the network operates normally but either the source or destination is limiting the bandwidth on communication. Here again, the horizontal axis represents the passage of time while the vertical axis represents the increase in sequence numbers. However, the plot of TCP sequence numbers reflects a straight line. Typically such a result is anticipated because it represents that the source is not reaching the maximum bandwidth limitation of the network or destination. Thus, while the TCP sequence numbers increase, the increase of the sequence numbers from one to the next is in a constant fashion across the entire illustrated plot, as opposed to an acceleration of those numbers that increases over time as shown in FIG. 2 and that also peaks from time to time as a normal limit is reached.

Figure 4:
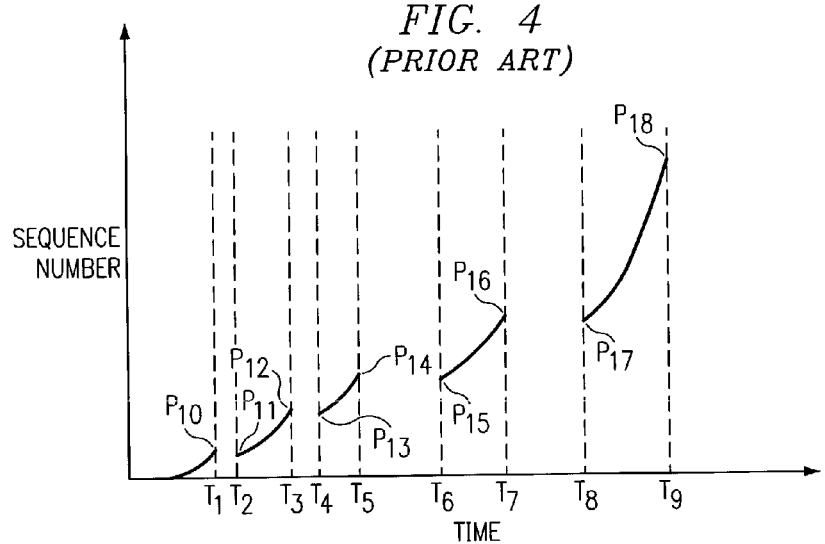
FIG. 4 illustrates a prior art plot of the evolution of TCP sequence numbers over time when during a TCP session the network is limiting the bandwidth of communication between the source and destination by dropping packets.

FIG. 4 illustrates a plot of the evolution of TCP sequence numbers over time, when during a TCP session the network is limiting the bandwidth of communication between the source and destination and, thus, it is presumed during such time that the source and destination are otherwise capable of communicating at their respective maximum bandwidths. However, the plot of TCP sequence numbers illustrates curves with discontinuities between the curves. For example, at time ti, the TCP sequence numbers are at a point $P_{10}$, but transmission is interrupted until a time $t_2$. At time $t_2$, however, note that a slight drop occurs in the TCP sequence number as shown at point $P_{11}$. This type of pattern repeats later at time $t_3$ where a sequence number shown as point $P_{12}$ is reached, but an interruption then occurs until communication through to the destination from the source is achieved at time $t_4$ and having a sequence number at point $P_{13}$. The behavior illustrated by these discontinuities occurs due to packet losses along the network as resulting from network irregularities. In other words, recalling that TCP communications are connection-oriented, when a network irregularity occurs one or more TCP packets will be lost, and those packets will be required to be re-transmitted by the source. As a result, the source, which receives the indication of the failure at a time when it was prepared to transmit a new packet having a certain TCP sequence number, is instead required to backtrack to re-transmit a previous packet with a lower TCP sequence number, followed by all packets following the re-transmitted packet. The beginning of such a re-transmission, therefore, is shown by way of example at point $P_{11}$ (and various other points in FIG. 4), where a drop is shown in TCP sequence number as compared to point $P_{10}$, where the drop occurs due to the backtrack and re-transmission by the source of a previously-transmitted packet(s).

Figure 5:
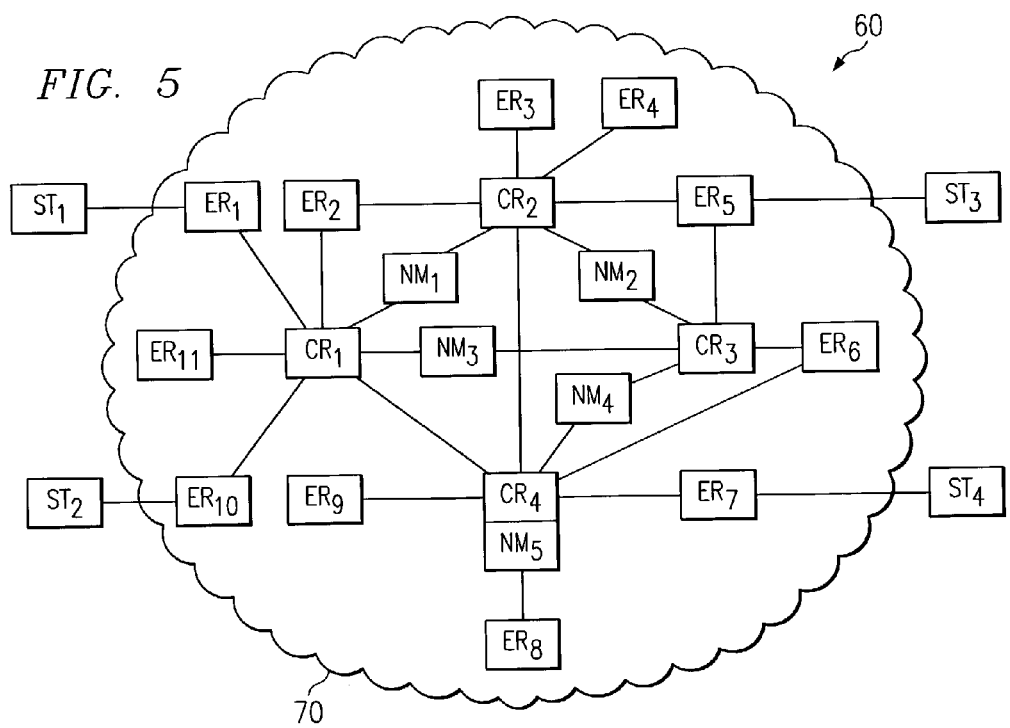
FIG. 5 illustrates a block diagram of a network system 10 into which the preferred embodiments are implemented.

FIG. 5 illustrates a block diagram of a system 60 into which the preferred embodiments are implemented. System 60 generally includes a number of stations $ST_1$ through $ST_4$, each coupled to a network 70 via a router, and each operable to send packets as a source or receive packets as a destination. By way of example, network 70 is an internet protocol ("IP") network such as the global internet or other IP-using network, where each station and IP networks in general are well known in the art. However, one skilled in the art should appreciate that the use of the IP protocol is by way of illustration, and many of the various inventive teachings herein may apply to numerous other protocols, including by way of examples asynchronous transfer mode ("ATM"), token ring, Novell, Apple Talk, and still others. In any event, returning to network 70 as in IP network, and also by way of an example, each station $ST_x$ may be constructed and function as one of various different types of computing devices, all capable of communicating according to the IP and to include the TCP protocol. Lastly and also by way of example, only four stations $ST_x$ are shown so as to simplify the illustration and example, where in reality each such station may be proximate other stations (not shown) and at a geography located at a considerable distance from the other illustrated stations. For example, station $ST_1$ might be located in Montana while station $ST_2$ is located in California, and station $ST_3$ might be located in New York while station $ST_4$ is located in Florida.

Continuing with FIG. 5, along the outer periphery of network 70 are shown a number of edge routers $ER_1$ through $ER_{11}$, while within network 70 are shown a number of core routers $CR_1$ through $CR_4$. The terms edge router and core router are known in the art and generally relate to the function and relative network location of a router. Typically, edge routers connect to remotely located networks and handle considerably less traffic than core routers. In addition and due in part to the relative amount of traffic handled by core routers, they tend to perform less complex operations on data and instead serve primarily a switching function; in other words, because of the tremendous amount of throughput expected of the core routers, they are typically hardware bound as switching machines and not given the capability to provide operations based on the specific data passing through the router. Indeed, core routers typically do not include much in the way of control mechanism as there could be 10,000 or more connections in a single trunk. Further, typically core routers do not involve their operations with TCP related items and instead deal at the IP level and below. In contrast, edge routers are able to monitor various parameters within data packets encountered by the respective router. In any event, the various routers in FIG. 5 are shown merely by way of example, where one skilled in the art will recognize that a typical network may include quite a different number of both types of routers. Finally, note that each core router $CR_x$ also generally may be constructed and function according to the art, with the exception that preferably the core routers may include additional functionality for purposes of traffic irregularity detection based on TCP sequence number evaluation as described below. In addition, each edge router $ER_x$ also generally may be constructed and function according to the art, with the exception that preferably the edge routers are responsive to the traffic irregularity detection of the core routers, as also described below.

Completing the discussion of FIG. 5, note that the various stations, edge routers, and core routers therein are shown connected to one another in various fashions and also by way of example. Such connections are intended to illustrate an example for later discussion of the preferred operation and also to reflect a general depiction of how networks are generally established. Thus, each station $ST_x$ is shown connected to a single edge router $ER_x$, where that edge router $ER_x$ is connected to one or more core routers $CR_x$. The core routers $CR_x$, also by way of example, are shown connected to multiple ones of the other core routers $CR_x$. By way of reference, the following Table 1 identifies each station and router shown in FIG. 5 as well as the other device(s) to which each is connected.

TABLE 1

| station or router | connected nodes |
|---|---|
| $ST_1$ | $ER_1$ |
| $ST_2$ | $ER_{10}$ |
| $ST_3$ | $ER_5$ |
| $ST_4$ | $ER_7$ |
| $ER_1$ | $ST_1$; $CR_1$ |
| $ER_2$ | $CR_3$; $CR_2$ |
| $ER_3$ | $CR_2$ |
| $ER_4$ | $CR_2$ |
| $ER_5$ | $ST_3$; $CR_2$; $CR_3$ |
| $ER_6$ | $CR_3$; $CR_4$ |
| $ER_7$ | $ST_4$; $CR_4$ |
| $ER_8$ | $CR_4$ |
| $ER_9$ | $CR_4$ |
| $ER_{10}$ | $ST_2$; $CR_1$ |
| $ER_{11}$ | $CR_4$ |
| $CR_1$ | $ER_1$; $ER_{11}$; $ER_{10}$; $ER_2$; $CR_2$; $CR_3$; $CR_4$ |
| $CR_2$ | $ER_2$; $ER_3$; $ER_4$; $CR_1$, $CR_3$; $CR_4$; $ER_5$ |
| $CR_3$ | $ER_5$; $ER_6$; $CR_2$, $CR_1$; $CR_4$ |
| $CR_4$ | $ER_7$; $ER_8$; $ER_9$, $CR_1$, $CR_2$; $CR_3$; $ER_6$ |

Given the various illustrated connections as also set forth in Table 1, in general IP packets flow along the various illustrated paths of network 70, and in groups or in their entirety such packets are often referred to as network traffic. In this regard and as developed below, the preferred embodiments operate to identify any irregularities in such network traffic. Finally, note that FIG. 5 may represent a simplified version of a network or the internet in that only a few stations and routers are shown, while one skilled in the art will readily appreciate that the inventive concepts in this document may be applied to a larger number of stations, routers, and the network interconnectivity between those devices.

FIG. 5 also illustrates a number of network monitors $NM_1$ through $NM_5$, where the choice of five such network monitors is only by way of example given the limited amount of other hardware that is shown for network 70. As detailed below, each network monitor $NM_x$ is operable to sample, and possibly respond to, irregularities in the TCP sequence number in an IP packet that passes along the conductor(s) to which the network monitor is connected. Further, the components of each network monitor $NM_x$ are described below, but at this point the connections of each such monitor are noted in the following Table 2:

TABLE 2

| network monitor | connected nodes |
|---|---|
| $NM_1$ | $CR_1$; $CR_2$ |
| $NM_2$ | $CR_2$; $CR_3$ |
| $NM_3$ | $CR_1$; $CR_3$ |
| $NM_4$ | $CR_3$; $CR_4$ |
| $NM_5$ | $CR_1$; $CR_2$; $CR_3$; $ER_7$; $ER_8$; $ER_9$ |

FIG. 5 and Table 2 demonstrate that each of network monitors $NM_1$ through $NM_4$ is connected to sample packets passing along the conductor(s) between a pair of core routers. However, network monitor $NM_5$ is by way of an alternative example incorporated into core router $CR_4$. As a result, network monitor $NM_5$ is able to sample packets communicated with any of the nodes to which core router $CR_4$ is connected, namely, core routers $CR_1$, $CR_2$, $CR_3$, and edge routers $ER_7$, $ER_8$, and $ER_9$. Thus, the contrast of network monitor $NM_5$ to the other illustrated network monitors $NM_1$ through $NM_4$ is shown to demonstrate that in the preferred embodiment each network monitor $NM_x$ may sample packets as a stand alone entity or may be combined with the hardware and software of an existing router; indeed, in the preferred embodiments a network monitor $NM_x$ also may be combined with network or element management systems. In any event and by way of introduction to details provided later, in the preferred embodiments the sampling functionality of each network monitor $NM_x$ permits real-time monitoring of the TCP sequence numbers in network packets, and in response determinations may be made, and actions may be taken, based on detecting network traffic irregularities based on the behavior of the TCP sequence numbers.

Figure 6:
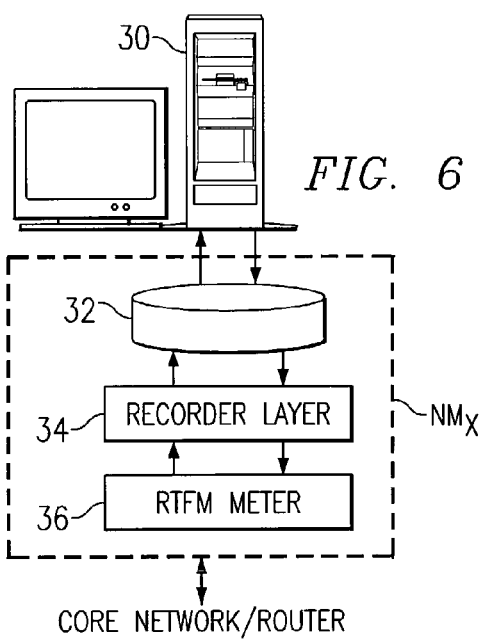
FIG. 6 illustrates a block diagram of each network monitor $NM_1$ through $NM_5$ of FIG. 5.

FIG. 6 illustrates a block diagram of each network monitor $NM_1$ through $NM_4$ of FIG. 1, with the further understanding that functionally the following description also may be applied to network monitor $NM_5$ with the addition that certain functionality may be provided by the hardware and software already available from core router $CR_4$. Turning then to FIG. 6, first note that a console 30 is associated with network monitor $NM_x$, where in the preferred embodiment a single such console 30 communicates with multiple network monitors $NM_x$. For example, returning briefly to FIG. 5, preferably each of network monitors $NM_1$ through $NM_5$ communicates with a single console 30, where such communications also may be by way of packets between console 30 and the network monitors $NM_x$. Console 30 may be constructed by one skilled in the art using various forms of hardware and software, where the selection is a matter of implementation choice in order to achieve the functionality described in this document. Turning to that functionality, console 30 preferably provides an administration (configuration) function and a characterization (reporting) function. To permit a user to perform these functions, various interfaces may be used such as a graphical Web-based configuration tool or a command line tool, where one preferable approach implements console 30, by way of example, using the Apache Web server with the PHP server-side scripting language to provide a dynamic interface to a flow store 32. In any event, the user interface preferably provides different screens for each of the administration and characterization functions. The actual interface and screens, however, may be implemented in various forms, where it is desirable for any form that a user can properly control console 30 to perform its administration and characterization function with respect to its flow store 32. Preferably, a network administrator or the like uses the administration functionality of console 30 to create a set of rules and to provide those rules along with a predictor methodology to an RTFM meter 36 described later, where those rules cause meter 36 to retrieve TCP sequence numbers and the predictor methodology is later used to evaluate the history of the TCP sequence numbers for a flow, as also discussed later. Also, once the system is configured and left to collect TCP sequence number information from or about the monitored packets, the network administrator can use the characterization screen to query the information so as to generate network status reports based on the collected information and to thereby detect any network irregularities.

As introduced above, console 30 is connected to a flow store 32, which preferably represents a storage medium that stores a flow database relating to monitored TCP sequence numbers. In the preferred embodiment, each network monitor $NM_x$ includes its own flow database, although alternative embodiments may be created where more than one network monitor $NM_x$ shares a common flow database. In the preferred embodiment the flow database in flow store 32 is an SQL-compatible database using the PostgreSQL relational database management system, and console 30 communicates with this database through the Web server's PHP link to the SQL database. Thus, any administration and configuration changes made via console 30 are passed directly to flow store 32. Given the preceding, one skilled in the art should appreciate that access to flow store 32 can be achieved by SQL queries, enabling network administrators to automate the configuration process or integrate report generation. In the preferred embodiment, flow store 32 stores what is referred to in this document as a "rule set" (or "rule sets" when plural), which is initially provided to the flow store 32 from console 30 as part of the administration function and which is also conveyed to meter 36. Additionally, flow store 32 stores the progression of TCP sequence numbers from a monitored flow between a source and destination node, as further detailed below. Moreover and as also discussed below, flow store 32 may store numerous different progressions of TCP sequence numbers, each corresponding to a monitored flow between sets of corresponding source and corresponding destination nodes. Still further, flow store 32 preferably stores packet time of arrival data, as also detailed later. Lastly, recall that an RTFM meter 36, described below, stores a predictor methodology. From this predictor methodology, analyses are preferably made on the TCP sequence number progression(s) and times of arrival as stored in flow store 32, and those analyses may be reported to console 30 and are also used as a basis to respond to network irregularities.

Continuing with FIG. 6, recorder layer 34 provides an interface between flow store 32 and a meter 36 (or meters) in use and coupled to the network, and meter 36 copies TCP sequence numbers from respective selected network packets passing through the meter. Specifically, as each network packet is identified as between a particular same source and destination node, meter 36, in response to a predictor methodology, provides the TCP sequence number from the packet to recorder layer 34, which in turn communicates that information to flow store 32. In the preferred embodiment, the monitored source and destination node can be determined randomly, or it can be identified from one or more rules in a rule set in flow store 32. Thus, the applications of recorder layer 34 can be separated into two categories: manager applications and meter reading applications. Manager applications configure meter 36, based on information, including rules in one or more rule sets, in flow store 32. Meter reading applications permit the TCP sequence number data collected by meter 36 to be provided in a data format usable by flow store 32 and, indeed, recorder layer 34 facilitates the passage of that data into the flow database of flow store 32. Recorder layer 34 applications may pass information between flow store 32 and the network probes of meter 36 either synchronously or asynchronously. This gives network administrators the flexibility of either using real-time network flow meters (i.e. NeTraMet) or importing data from other network analysis tools that are not able to provide real-time data (e.g. Cisco NetFlow data).

In the preferred embodiment, meter 36 is a Real-Time Traffic Flow Measurement ("RTFM") meter which is a concept from the Internet Engineering Task Force ("IETF"). As known in the RTFM art, RTFM meters are previously known to be used in systems for determining the service requested by IP packets that are passing through a network for purposes of collecting revenue, where such a service is identifiable by the transport port number specified in each IP packet. For example, RTFM meters are currently being considered for use in systems whereby an internet user is charged based on the service he or she is using on the internet; for example, a different fee may be charged to the user for each different internet service, including mail, video, phone calls, and web browsing. However, as detailed in this document, the preferred embodiment implements the RTFM meter instead to analyze each IP packet and to determine if the packet is a TCP packet between a given source and destination and, if so, to copy its TCP sequence number for storage so that the copied numbers can be interpreted for purposes of monitoring network activity so as to evaluate network performance and, hence, identify any irregularities with such performance. More specifically, meter 36 physically probes the underlying network traffic and each time meter 36 detects an IP packet on the network, it determines whether the packet is a TCP packet and is between a given (i.e., either randomly or specifically identified) source and destination. Accordingly, during the real-time passage of numerous IP packets by the evaluating meter 36, that meter 36 does not always copy a fixed portion of each such packet into a database such as the entire packet or the entire packet header; instead, each meter 36 evaluates the source and destination address of each TCP packet and, if a given source and destination are matched, then meter 36 communicates the TCP sequence number for the packet to recorder layer 34. In response, recorder layer 34 inserts the captured TCP sequence number into flow store 32. Accordingly, that stored information is then available for analysis and reporting to console 30, as detailed below.

FIG. 7 illustrates a flow chart of an overall method 40 of operation for each network monitor $NM_x$ of FIGS. 5 and 6, where method 40 is now described and additional preferred details are provided later with respect to FIG. 8. Additionally, while method 40 is described below with respect to a single network monitor $NM_x$, preferably each network monitor $NM_x$ performs a comparable method at its respective location in network 70. As a result, distributed operations occur at different network locations, where by way of example the results of each individual network monitor $NM_x$ may be accumulated by a common resource, such as at a single console 30. From this accumulated information, greater accuracy may be achieved in identifying network irregularities and their causes.

Turning to method 40, in step 42 a network monitor $NM_x$ according to the preferred embodiment first detects and stores the TCP sequence numbers for each of a number n TCP packets between a first set of source and destination nodes. In the preferred embodiment, the first set of source and destination nodes can be selected randomly or may be specified by a rule in flow store 32 that is conveyed to meter 36. By way of one example, preferably such a first set includes only a single source and a single destination. Also by way of example, each of the single source and single destination is likely in a different physical sub-network, where each such sub-network is identifiable in that nodes in each sub-network share a same portion of their address as directed to the sub-network, where typically such an address portion is that following the subnet mask in the packet address. By way of an illustrative example, assume that the source is the FIG. 5 station $ST_1$ in a first physical sub-network in Montana and the destination is station $ST_3$ in a second physical sub-network in New York. Thus, for step 42, the RTFM meter 36 of the given network monitor $NM_x$ evaluates each packet passing through the meter to determine if the packet is a TCP packet from the certain source to the certain destination in the two respective sub-networks. If so, then the TCP sequence number for that packet is stored. Once n such TCP sequence numbers are stored (i.e., corresponding to n packets between the same source and destination along the logical sub-network of interest), then step 42 also processes those sequence numbers so that the regularity of subsequently received packets may be predicted, but a discussion of such processing is deferred until later. In any event, note that at the initial completion of step 42, a first window of n packets will have been detected and processed; this window is updated to maintain a total of n packets by later processing subsequent selected packets, where for each such subsequent packet its information is processed and added to the overall information while at the same time the information for the then-oldest packet is removed from the processed information. These details are better understood below. In any event, once step 42 is complete, method 40 continues to step 44.

In step 44, the network monitor $NM_x$ continues to monitor IP packets until it detects another TCP packet between the step 42 source and destination, and then step 44 determines whether an irregularity exists in the TCP sequence number of the additionally-detected packet. Specifically, from the plots of FIGS. 2 through 4, once a sufficient number n of TCP sequence numbers are collected in step 42, a plot of those numbers and the TCP sequence number from the additional packet in step 44 may be compared as against the trends represented by the plots of FIGS. 2 through 4, where the case of FIG. 4 is of particular interest in the preferred embodiments. However, in practice, such an approach may require a considerably large value set for the value n of step 42 or it may involve a considerable delay in either collection or analysis time. Accordingly, in the preferred embodiment, step 44 collects one TCP sequence number from a next TCP packet in the first set. Additionally and as detailed below, through the use of the predictor methodology in meter 36, as also introduced with respect to the processing of n packets in step 42 so that the regularity of future packets may be predicted, step 44 determines whether the actual TCP sequence number of the newly-collected TCP packet is within a range as predicted from the n previously-collected TCP sequence numbers of step 42; further, step 44 also preferably determines whether the newly-collected TCP packet arrives within a time as expected based on the time of reception of one or more of the n previously-collected sequence numbers of step 42. Additional details for this predictor methodology are described below. For sake of continuing with FIG. 7 at this point, however, step 44 generally determines, such as through the use of the predictor methodology, whether an irregularity in the TCP sequence number of the newly-detected packet exists, such as may be indicated if the TCP sequence number of the newly-detected packet, and/or the time of arrival of the newly-detected packet, deviates beyond a threshold. Such an irregularity may reflect the conditions of FIG. 4. If no such irregularity is detected, then the flow returns to step 44 to detect another TCP packet in the first set and to repeat the same analysis with respect to its time of arrival and TCP sequence number. If an irregularity is detected, then flow continues from step 44 to step 46.

Before discussing step 46, note also in step 44 that regardless of whether an irregularity is detected, step 44 also indicates that the newly-detected packet is processed to update the data based on n packets. Specifically, recall that step 42 detects a first group of n packets in the first set and processes the sequence numbers of packets so that the regularity of future packets may be predicted. Looking now to step 44, the latter indication of processing in that step 44 is intended to demonstrate that step 44 also updates the previous data based on the n packets of the preceding step 42. In the preferred embodiment, this updating is such that the packet detected in step 44 becomes one of the n packets, whereas the oldest first set packet received by step 42 is now removed from the n packets. In other words, preferably the data relating to n packets is updated in a sliding window type manner, where at any given time after step 42, the data and the predictions derived from that data as detailed below, relate only to the most recently received n packets in the first set. Once updated in this manner, the flow continues from step 44 either to step 46 or to return to step 44, as discussed earlier.

In step 46, having been reached due to a detected TCP sequence number irregularity between a source and destination in the first set from step 44, the network monitor $NM_x$ detects a TCP sequence number from one or more additional TCP packets communicated in the first set (e.g., as between the single source and single destination mentioned in the example of step 42). For each of these additionally-detected packets in the first set, step 46 determines whether the TCP sequence number (and arrival time) also indicates an irregularity as compared to previous TCP sequence numbers and times of arrival of packets between the same source and destination. If an irregularity is not detected, then the preferred embodiment operates under the assumption that the irregularity detected in the preceding step 44 was either an isolated incident, a relatively minor irregularity, or otherwise not reason to make a network response or adjustment, and the flow of method 40 returns from step 46 to step 44. On the other hand, if an irregularity is detected in step 46, then the preferred method flow continues to step 48. As detailed below, preferably an irregularity is considered as detected if the TCP sequence number and/or time of arrival of the TCP sequence packet deviates beyond a threshold, where the deviation relative to the threshold is measured based on an predicted TCP sequence number and time of arrival as provided by the predictor methodology. This threshold may be selected by one skilled in the art, and by way of example may be on the order of five percent from the predicted value.

Before discussing step 48, note that step 46 also indicates at its conclusion, and in the same manner as discussed above with respect to step 44, that regardless of whether an irregularity is detected, step 46 also processes the newly-detected packet to update the data based on n packets. Once more, therefore, this indication is intended to represent the update operation achieved by the sliding window, to again encompass information based on a total of n packets. Accordingly, in step 46 the updating is such that the packet (or packets) detected in step 46 becomes one of the n packets, whereas the oldest first set packet received by step 42 or step 44 is now removed from the n packets. Again, therefore, the data after step 46, and the predictions derived from that data as detailed below, relate only to the most recently received n packets in the first set. Once updated in this manner, the flow continues from step 46 either to step 48 or to return to step 44, as discussed earlier.

In step 48, the network monitor $NM_x$ continues to monitor IP packets and now collects IP sequence numbers and time of arrival data for packets in a second set of source and destination nodes, where the second set is preferably related in some rational sense to the first set (e.g., the single source and single destination) of steps 42, 44, and 46 and the second set is also defined by a rule or rules conveyed from flow store 32 to meter 36. For example, recall earlier that step 44 was demonstrated by monitoring packets to detect those between source station $ST_1$ in a first sub-network in Montana and destination station $ST_3$ in a second sub-network in New York. Further, for step 48, and since the second set is preferably related to the first set, then as a first example of step 48 consider that the second set includes any source node in the same physical sub-network as station $ST_1$ in Montana and any destination node in the same physical sub-network as station $ST_3$ in New York. As a second example of step 48, the second set may include any source node in a different physical Montana sub-network (i.e., not including the sub-network of station $ST_1$) and any destination node in a different physical New York sub-network (i.e., not including the sub-network of station $ST_3$). As a third example of step 48, the second set may include any source node in the same physical sub-network as station $ST_1$ in Montana, but any destination node in a specified physical sub-network as station $ST_4$ in Florida; this latter example may prove beneficial where again this second set relates in some sense to the first set, such as may be the case where the destination sub-network of the first set (i.e., in New York) communicates packages received from Montana onward to Florida. In any event, the relationship between the first and second set is preferably stated or implied in the rule set(s) stored in flow store 32. In this manner, one skilled in the art may establish different rules to thereby encompass different relationships between the first and second monitored steps, and to thereby draw corresponding conclusions based on any irregularities in the traffic flow between the nodes of the two different sets. Also in this regard, in one preferred embodiment the second set may includes the first set, and it also preferably includes a greater number of nodes than the first set. For example, step 44 (and 46) may be directed to a single source node and a single destination node, while step 48 is directed to multiple source nodes and multiple destination nodes. In any event, therefore, in step 48 and for each packet passing through the network monitor $NM_x$, if it is a TCP packet of the second set, then the network monitor $NM_x$ preferably copies the TCP sequence number, source address, destination address, and time of arrival for each of n packets between a same source and destination in the second set. In other words, if the second set has three sources, each communicating with three respective destinations (in addition to the first set source and destination), then step 48 endeavors to collect packet data for each these three pairs of source/destination nodes, thereby accumulating data for a total of three times n packets. Thereafter, method 40 continues from step 48 to step 50.

In step 50, the network monitor $NM_x$ generally operates in the same fashion as described above with respect to step 46, that is, another packet is detected and processed; however, step 50 performs its analysis with respect to the packet information obtained from step 48 in view of a next received second set packet. In other words, while step 46 analyzed packets from the first set, step 50 analyses the TCP sequence numbers and times of arrival for packets from the second set, again determining whether those two parameters deviate beyond a certain percent relative to a predicted value provided by a predictor methodology. In the preferred embodiment, the threshold of step 50 may be the same or different than the threshold used by step 46. In any event, if the deviation, if any, is less than or equal to the step 50 threshold, then method 40 proceeds under the assumption that the earlier-detected irregularity from steps 44 and 46 were limited to the nodes in the first set, and the method returns to step 44; optionally, however, as also shown in FIG. 7, before returning to step 44, the flow can pass through a step 50a wherein an alarm is issued relating solely to the first set of packets. In other words, if no irregularity is found in the second set packet as examined by step 50, then there is still the observation from the affirmative findings in steps 44 and 46 that there was an irregularity in at least two first set packets. Thus, if the level of granularity at interest is such that irregularities solely within the first set are of interest, then step 50a represents an indication, such as an alarm, relating to the first set so that future examination or action may be taken with respect to the cause of the first set irregularity. Continuing with step 50, however, if the second set packet deviation exceeds the step 50 threshold, then method 40 continues to step 51.

Before discussing step 51, note that step 50, in the same manner as steps 44 and 46 discussed above, also indicates at its conclusion the operation of processing the newly-detected packet to update the data based on n packets. Here, note that the packet at issue is a second set packet (as monitored from step 48). Accordingly, the data based on a sliding window of n packets continues to be updated, but now that data is reflective of packets in the second set, which recall preferably reflects a larger number of source and/or destinations as compared to the first set. Further, the updated data is only that relative to the specific source and destination between which the step 50 packet was communicated. Lastly, as this update occurs for a packet, the data from the oldest packet of the previously-processed n packets is preferably no longer maintained.

In step 51, having been reached due to a detected TCP sequence number irregularity between a source and destination in the second set from step 50, the network monitor $NM_x$ detects one or more additional TCP packets communicated in the second set. For each of these additionally-detected packets in the second set, step 51 determines whether the TCP sequence number (and arrival time) also indicates an irregularity. If an irregularity is not detected, then the preferred embodiment operates under the assumption that the irregularity detected in the preceding step 50 was either an isolated incident, a relatively minor irregularity, or otherwise not reason to make a network response or adjustment, and the flow of method 40 returns from step 51 to step 44, again with the option as shown in step 50a of indicating an alarm relating to the irregularities detected earlier with respect to the first set packets. On the other hand, if an irregularity is detected in step 51, then the preferred method flow continues to step 52. Lastly, as with steps 44, 46, and 50, for a given packet between a specific source and destination, step 51 also concludes by updating the data from the sliding window of the most recent n packets in the second set as between that specific source and destination, as updated for each packet (or packets) as detected by step 51.

From the preceding, one skilled in the art will appreciate that step 52 is reached when method 40 has detected irregularities in the TCP sequence numbers and/or TCP packet times of arrival in both the first and second sets of source and destination nodes. Thus, irregularities have been detected in communications between a plural number of source and destination nodes having a relationship to one another, where that relationship is implied by the rule(s) that define the first and second sets. Note that the actual irregularity may be for various reasons. Moreover, the specific reason(s) causing the irregularity may be inferred based on the amount of the deviation between the actual and predicted values. For example, if the predicted and real values differ by a figure of approximately 50 percent, then the preferred embodiment concludes that a packet (or more than one packet) was lost. This might occur because the source TCP control window was halved or the destination may have dropped a packet. Still other examples may be ascertained by one skilled in the art. In any event, in step 52, method 40 attempts a corrective action to improve traffic flow in view of the irregularity. Preferably, such a corrective action is taken by the network meter issuing an event report, such as via a network packet, to the edge routers $ER_x$ on the logical sub-network having the detected irregularity(ies). The edge router, in response, may take various actions. For example, one or more alarms may be set off to indicate to a user or network manager that an irregularity or irregularities have been detected. As another example, traffic queuing at the edge routers $ER_x$ relating to the logical sub-network at issue may be adjusted. As still another example which is likely a rare case, there may be an observation that 90% of the flows are losing packets independently of their source and destination; in this case there is likely a considerable issue with the link where the abnormal behavior has been observed.

Two additional observations are also noteworthy with respect to method 40. As a first observation, note that method 40 only generally illustrates the use of two sets of packets, where by way of example the first set is reflected in steps 42 through 46 and in one instance may be packets between only a single source and single destination of two respective physical sub-networks, where the second set is reflected in steps 48 through 51 and in one instance may be all packets between any source and any destination of the same two respective physical sub-networks. However, the present inventive teachings contemplate different divisions for each set, where there may be additional iterations for number, where preferably each additional set encompasses all packets in a lesser analyzed set. In this manner, the analysis of method 40 effectively continues to expand its scope to consider a greater amount of network traffic, each time including the traffic as considered during the lesser scope of analysis. In operating in this fashion, a greater amount of data may be collected to determine the magnitude of a potential irregularity in network traffic. As a second observation, note that each of steps 46 and 51 states that it evaluates one or more additional packets. This is intended to demonstrate that the irregularity detection for a given set can be based on any number of packets; thus, by looking only at FIG. 7, steps 44 and 46 may appear to represent the analysis of only two first set packets, but the earlier statement that step 46 may include multiple packets is intended to indicate that the inventive scope includes a variation where more than two first set packets are processed, that is, for each of those packets, they are analyzed to determine if an irregularity exists, and the data from those packets is also used to update the sliding window of n packets. Similarly, from FIG. 7 alone, steps 50 and 51 may appear to represent the analysis of only two second set packets, but the earlier statement that step 51 may include multiple packets is intended to indicate that the inventive scope includes a variation where more than two second set packets are processed, that is, for each of those packets, they are analyzed to determine if an irregularity exists, and the data from those packets is also used to update the sliding window of n packets corresponding to each source and destination between which each packet is communicated.

Figure 8:
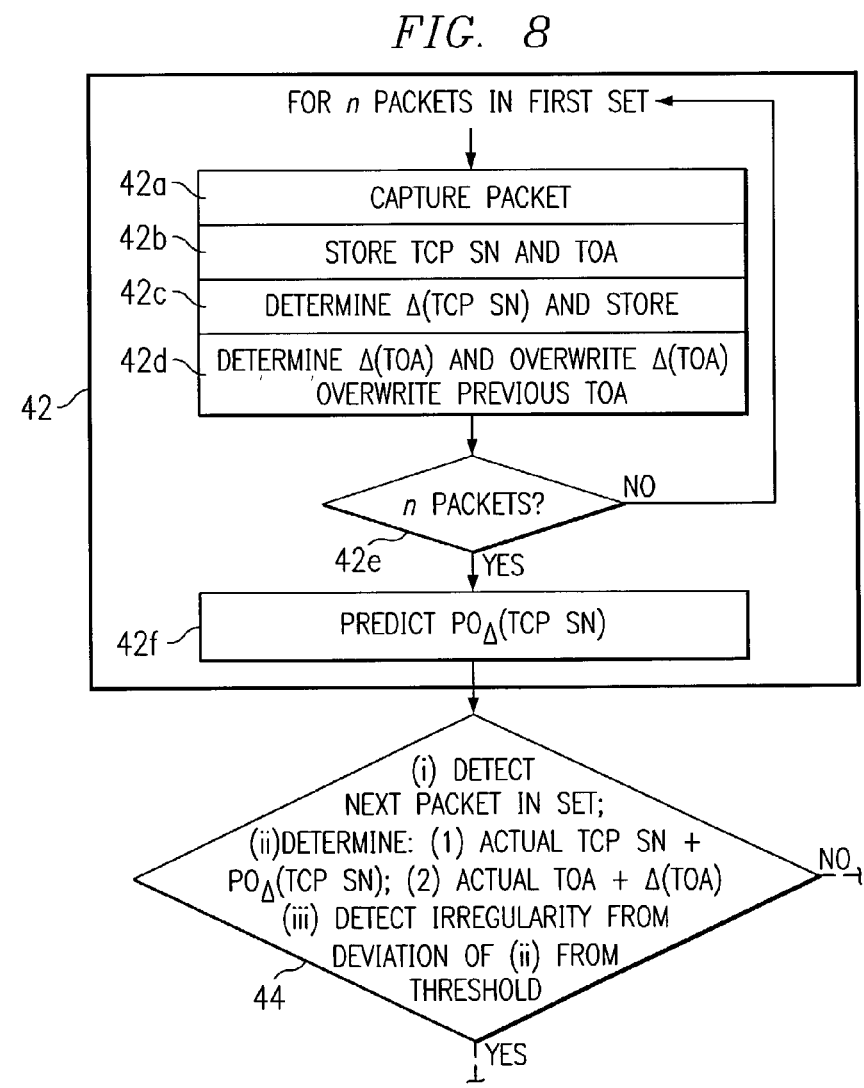
FIG. 8 illustrates a flow chart of the predictor methodology preferably implemented within the flow chart of FIG. 7.

FIG. 8 illustrates a flow chart of the predictor methodology introduced above and which is therefore preferably used in connection with method 40 of FIG. 7. Indeed, for sake of cross-reference between FIGS. 8 and 7, the predictor steps of FIG. 8 may be considered to occur as part of various steps from method 40 of FIG. 7. Thus, by way of example, FIG. 8 illustrates steps 40 and 42 from FIG. 7 and which are shown generally with an elaboration of various sub-steps as described below. Further, while the illustration of FIG. 8 is directed to steps 42 and 44, one skilled in the art should appreciate that the discussion below with respect to newly-received and processed as described above, also receives an additional packet(s) and updates the corresponding sliding window of n packet data, where from the following it will become apparent that from each update additional parameters are predicted and those predictions form the basis for detecting irregularities in each of steps 44, 46, 50, and 51. This processing is now further explored below in the various sub-steps of step 42.

In sub-step 42a, the network monitor $NM_x$ detects a network packet of the first set, that is, a packet having a source and destination address matching the source and destination (or multiple sources and destinations) that are specified, by a rule(s), to be monitored. In sub-step 42b, the TCP sequence number ("SN") and the time of arrival ("TOA") of the detected TCP packet are stored, such as in a buffer located in flow store 32. In sub-step 42c, a difference, or offset, is determined and stored for the TCP SN parameter of sub-step 42b relative to the immediately-preceding packet that was received for the same source and destination. In other words, a TCP SN offset is determined by subtracting from the TCP SN of the presently-detected packet the TCP SN of the immediately-preceding packet that was received for the same source and destination. For the sake of reference, this offset value is hereafter referred to as $\Delta$(TCP SN), and in the preferred embodiment it is stored in flow store 32. Further, because sub-step 42c is repeated for each of the n packets, then in the preferred embodiment the TCP SN is stored and the value $\Delta$(TCP SN) is computed for each of the n packets (although the first packet in the n packets may not provide a value of $\Delta$(TCP SN) because there is no immediately-preceding packet from which to make the determination of the then-present packet relative to the immediately-preceding packet).

In sub-step 42d, a difference, or offset, is determined for the TOA parameter of sub-step 42b relative to the immediately-preceding packet that was received for the same source and destination. However, unlike the operation with respect to $\Delta$(TCP SN), preferably there is no storage of multiple offset values of TOA for the multiple ones of the n packets. Instead, in the preferred embodiment and in order to reduce complexity and storage requirements, for each packet received, first the difference between the actual TOA of the received packet and the stored value of the immediately-previous packet (of the same set) is determined, and that difference, hereafter referred to as $\Delta$(TOA), is stored to a single location. Once that value of $\Delta$(TOA) is stored, then the actual TOA of the present packet is also stored to single storage location, thereby overwriting the actual TOA of any previous packet. Thus, when a next packet in the n packets is received, sub-step 42d again operates in this manner, thereby determining the $\Delta$(TOA) as between that packet and the immediately-preceding packet, and then overwriting the previous value of $\Delta$(TOA) with a new value of $\Delta$(TOA) and also overwriting the previously-stored actual TOA of the immediately-preceding packet with the actual TOA value of the then-processed packet.

Sub-steps 42a through 42d continue for a total of n packets in the first set, where such a repetition is shown by the condition sub-step 42e. In other words, until n packets are processed through sub-steps 42a through 42d, then those sub-steps are repeated, thereby storing the value $\Delta$(TCP SN) for each of the n packets relative to the packet that preceded it. However, with respect to the TOA, only the TOA of the immediately-preceding packet is saved and it is overwritten once another packet is detected and the value of $\Delta$(TOA) with respect to that packet is determined and stored. Once n packets are processed in this manner, step 42e causes the flow to continue to sub-step 42f.

Sub-step 42f predicts an offset to the TCP SN for a future packet having the same source and destination as the n packets already detected. In the preferred embodiment, in order to provide the prediction of the offset with respect to the next TCP SN, first step 42f reviews the n stored values of $\Delta$(TCP SN) and chooses the most common stored value as the predicted TCP SN offset value for future packets. For sake of reference, the predicted offset value is hereafter referred to as $PO_A$(TCP SN). Note also that one skilled in the art may implement alternative manners of processing the n stored values of $\Delta$(TCP SN) in order to provide the predicted value of $PO_A$(TCP SN). In any event, once $PO_A$(TCP SN) is determined, method 40 continues to step 44.

Looking to step 44 in FIG. 8, recall first from FIG. 7 that step 44 detects another TCP packet between the step 42 source and destination, and then step 44 determines whether an irregularity exists in the TCP sequence number of the new packet as compared to past TCP sequence number history. According to the preferred predictor methodology, the determination of an irregularity is made using the predicted offset value $PO_A$(TCP SN) and the last-determined offset time of arrival value, $\Delta$(TOA), from sub-step 42d by determining predicted values with respect to the newly-detected packet. Specifically, the offset value of $PO_A$(TCP SN) is added to the TCP SN of the immediately-preceding received packet in the first set, that is, the previous TCP SN is increased by the offset value it is predicted to change based on step 42f. Also, the value of $\Delta$(TOA) is added to the TOA of the immediately-preceding received packet in the first set, that is, the TOA of the immediately-previous first set packet is increased by the amount of time that occurred between that previous packet and the packet that preceded it. These two totals, therefore, represent what are a predicted values for the TCP SN and TOA of the packet detected in step 44. Given these expected values, the actual detected values of the packet detected in step 44 are compared to the predicted values, and a measure of deviation may be determined between the two. If the deviation, for either TCP SN or TOA, between the actual value and the predicted value is beyond a threshold, then an irregularity is deemed to occur and, as described above with respect to FIG. 7, method 40 continues to step 46. To the contrary, if the deviation is equal to or less than the threshold, then no irregularity is deemed to occur and, as described above with respect to FIG. 7, method 40 returns to step 44 to detect a next TCP packet in the first set and to process that step as just described. Note also now that the threshold may be adjusted by one skilled in the art based on various considerations, including the observations made in FIGS. 2 through 4.

Before proceeding recall also that step 44 in FIG. 7 concludes with an update of the data based on n packets. Given the sub-steps shown in FIG. 8, one skilled in the art should now appreciate that this update operates in the same general manner as for the first n packets in step 42, but for step 44 the packet at issue is the step 44 detected packet. Thus, for step 44, the offset value $\Delta$(TCP SN) is determined with respect to the step 44 packet and in view of the immediately-preceding packet from step 42; particularly, $\Delta$(TCP SN) is determined by subtracting from the TCP SN of the presently-detected step 44 packet the TCP SN of the immediately-preceding packet that was received for the same source and destination in step 42. Also, the step 44 value $\Delta$(TCP SN) is stored while the oldest value of the n stored values of $\Delta$(TCP SN), as corresponding to the oldest received first set packet in a group of n packets, is discarded (e.g., overwritten). As a result, the determination of the predicted offset value, $PO_A$(TCP SN), also may be updated given the newest value of $\Delta$(TCP SN) and the removal of the oldest value of $\Delta$(TCP SN). Also as part of the step 44 update, a new value of $\Delta$(TOA) is determined, here by comparing the TOA of the step 44 packet with the last received packet in step 42. Again, the new value of $\Delta$(TOA) is stored, thereby overwriting the actual TOA of any previous packet. Lastly, note that these same update principles, as applying to $\Delta$(TCP SN) and $\Delta$(TOA), also apply to steps 46, 50, and 51, that is, each indicated update is preferably achieved in the same manner with respect to these two parameters, where in each instance the most recently detected packet, for either the corresponding first or second set, is used to adjust $\Delta$(TCP SN) so that is reflective of the last n received packets as between the same source and destination as the previous packets, and similarly $\Delta$(TOA) is adjusted as a comparison between the presently received packet and its immediate predecessor of the same set.

Having described the application of the preferred predictor methodology with respect to step 44, as mentioned above note that a comparable analysis is also preferably performed with respect to steps 46, 50, and 51 in FIG. 7. For example, recall from FIG. 7 that step 46 detects whether an irregularity occurs for an additional packet in the first set only once step 44 detects a first TCP packet in the first set with an irregular deviation in its throughput (e.g., as detected based on TCP SN and TOA). In the case where step 46 detects multiple packets, then it updates and uses the most current value of $PO_A$(TCP SN) as relating to the immediately-preceding n packets in the first set. Thus, for each received packet its actual TCP SN is compared to the sum of the TCP SN of the immediately-preceding packet plus the then-updated value of $PO_A$(TCP SN). Additionally, a time of arrival analysis is made for each packet, where the time of arrival of the then-detected packet is compared to the predicted time of arrival based on the $\Delta$(TOA) value from the immediately-preceding packet. Thus, the value of $\Delta$(TOA) is also changed for each successive packet. In other words, each time a first set packet is detected, the TOA of the immediately-preceding first set packet is subtracted from the TOA of the then-received first set packet, and the difference is stored as $\Delta$(TOA); that difference is then added to the TOA of the then-received first set packet to predict the TOA of the next received first set packet, and when that next received first set packet is received, its TOA is compared to the immediately-previous predicted TOA. Again, a deviation beyond a threshold gives rise to some type of corrective/warning response. Further, the preceding as applied to step 46 will also be readily applied by one skilled in the art to steps 50 and 51.

An additional observation is also contemplated with respect to the TOA and $\Delta$(TOA) values included within the present inventive scope. Particularly, the preceding describes the use of only two successive packets to determine those two values with respect to any of steps 42, 44, 46, 50, and 51. However, note that the changing of $\Delta$(TOA) immediately after an irregular packet is received may cause difficulty in detecting further TOA irregularities. Specifically, if the TOA of the irregular packet is used to overwrite a previous TOA and also to determine the next $\Delta$(TOA), then that next value of $\Delta$(TOA) may itself be irregular because it is based on an irregular packet. As such, the next packet may arrive at a regular timing, but its timing may be misconstrued as irregular because it will be compared to $\Delta$(TOA) as derived from the previously-received irregular packet. Accordingly, further contemplated within the present inventive scope are other manners of determining $\Delta$(TOA). As one example, rather than using only the TOA from two successive packets, the TOA of a number of packets greater than two may be compared against one another to determine a $\Delta$(TOA), such as via the average of the difference between the TOAs of each of the previously-received packets.

Having described the application of the preferred predictor methodology with respect to steps 44 and 46, note that a comparable analysis is also preferably performed with respect to steps 50 and 51, but as relating to the second set. Therefore, when a new second set packet is detected, the value of $PO_A$(TCP SN) comparable to that from sub-step 42*f* is added to the TCP SN of the immediately-preceding second set packet and the result is compared to the actual TCP SN of the new second set packet. Similarly, when the new second set packet is detected, its actual TOA is compared to the sum of the TOA of the immediately-preceding second set packet with the difference in TOA between that immediately-preceding second packet and the second set packet which preceded it. The comparisons provide an indication of a deviation, if any, between the predicted TCP SN and TOA values and the actual values, and for the sake of step 50 or 51 those deviations are compared to the step 50 or 51 threshold as described above, with a response taken based on how the deviations, if any, compare to the step 50 threshold.

From the above illustrations and description, one skilled in the art should appreciate that the preferred embodiments provide a manner of monitoring the flow of network packets, with a particular benefit having been shown for monitoring TCP packets based on their TCP sequence numbers as well as their times of arrival. By the preferential analysis of flows in terms of TCP sequence numbers and times of arrival, a measure of throughput is realized, which as evidenced in FIGS. 2 through 4 depicts the change of TCP sequence numbers as it relates to the times of arrival. The embodiments provide numerous benefits over the prior art. As one example of a benefit, unlike the prior art active systems, the preferred embodiments do not send special test packets (e.g., PING) and do not introduce additional test traffic onto the route of the regular data packets. Thus, in this sense the preferred embodiments do not impact the network performance. As another example of a benefit, as compared to the traditional passive measurement mechanisms in which the IP packets (or portions thereof) are routinely stored and then later studied using an off-line analysis of historical data, the preferred embodiments use real-time RTFM meters to retrieve packet information from packets as they are incurred during actual real-time traffic flow and to store portions of those packets; this stored data is also preferably used in a real-time or near real-time manner, such as on the order of less than one second of when the packet sequence numbers and times of arrival are collected, to evaluate the regularity of the underlying network and to take corrective action(s), if necessary. As still another example of a benefit, prior art MIBs provide single point analysis directed to the traffic flow at the location of the MIB. In contrast, the preferred embodiments contemplate analyzing real-time collected packet information from multiple points in the network and they are not constrained to the hardware type or manufacturer of each router. Still further, the preferred embodiments also provide numerous benefits inherited from the following intrinsic advantages of RTFM meter architecture: (1) all data on the IP network is recordable; (2) functional even when the given network elements are incapable of flow monitoring; (3) independence from physical and data layer technologies; and (4) good performance even during fault conditions. In all events, the preceding as well as other benefits should be appreciated by one skilled in the art. As another benefit, while the preferred embodiments are implemented with respect to TCP sequence numbers, the inventive teachings likewise may apply to another selected field(s) in a packet that readily distinguishes that packet from past and future packets in the sequence, where based on past packets the future packets can be monitored given an expectation of the value of the selected field for each of the future packets. As a final benefit, while the preferred embodiments are particularly advantageous in IP networks, they also may be applied to numerous other networks as well. In addition, while the present embodiments have been described in detail, various substitutions, modifications or alterations could be made to the descriptions set forth above without departing from the inventive scope which is defined by the following claims.

The invention claimed is:

1. A network monitoring system, comprising:
   storage circuit for storing network packet information, wherein the network packet information includes a predicted identifier; and
   at least one monitoring circuit coupled to a network along which network traffic flows in a form of packets, the at least one monitoring circuit programmed to perform the steps of:
      receiving a packet communicated along the network;
      determining whether the received packet is communicated between a source and destination in a first set of network nodes, wherein each packet in a sequence of communications between the source and the destination comprises a packet identifier that uniquely identifies the packet from all other communications in a flow between the source and the destination; and
      responsive to determining the received packet is communicated between a source and destination in the first set of network nodes, comparing the packet identifier of the received packet to the predicted identifier to determine an identifier deviation between the packet identifier and the predicted identifier for identifying an irregularity in the network traffic, wherein the at least one monitoring circuit is programmed to further perform the step of, responsive to determining the received packet is communicated between a source and destination in the first set of network nodes, comparing a time of arrival of the received packet to a predicted time of arrival to determine a time deviation between the time of arrival and the predicted time of arrival; and
      wherein the at least one monitoring circuit is programmed to further perform, prior to the step of comparing a time of arrival, the step of determining the predicted time of arrival in response to a difference in time between two successively-received packets between the source and the destination in the first set of network nodes.

2. The system of claim 1 wherein the at least one monitoring circuit is programmed to further perform the steps of:
   comparing the identifier deviation to a threshold; and
   responsive to the identifier deviation exceeding a threshold, indicating an alarm.

3. The system of claim 1 wherein the at least one monitoring circuit is programmed to further perform the steps of:
   comparing the identifier deviation to a threshold; and
   responsive to the identifier deviation exceeding a threshold, adjusting packet communications between the source and the destination.

4. The system of claim 3:
   wherein the at least one monitoring circuit monitors packets between core routers; and
   wherein the adjusting step adjusts packet communications at an edge router.

5. The system of claim 1 wherein the packet identifier comprises a sequence number.

6. The system of claim 1:
   wherein the packet comprises a TCP packet; and
   wherein the packet identifier comprises a TCP sequence number.

7. The system of claim 1 wherein the at least one monitoring circuit is programmed to further perform, prior to the comparing step, the steps of:
   receiving a plurality of packets communicated along the network;
   for each packet in the plurality of packets:
      determining whether the received packet is communicated between a source and destination in the first set of network nodes; and
      responsive to determining the received packet is communicated between a source and destination in the first set of network nodes, storing in the storage circuitry the packet identifier of the received packet.

8. The system of claim 7 wherein the at least one monitoring circuit is programmed to further perform the step of determining the predicted identifier in response to a plurality of packet identifiers stored by the storing step corresponding to a plurality of packets in the first set.

9. The system of claim 8 wherein the at least one monitoring circuit is programmed to further perform the step of determining the predicted identifier as a most common one of the plurality of packet identifiers.

10. The system of claim 1 wherein the first set consists of a single source and a single destination node.

11. The system of claim 1 wherein the first set comprises a plurality of source nodes in a first physical sub-network and a plurality of destination nodes in a second physical sub-network that differs from the first physical sub-network.

12. The system of claim 1 wherein the at least one monitoring circuit is programmed to further perform the steps of, responsive to determining that the identifier deviation exceeds a threshold:
   receiving an additional packet communicated along the network;
   determining whether the additional packet is communicated between the source and the destination in the first set of network nodes; and
   responsive to determining the additional packet is communicated between a source and destination in the first set of network nodes, comparing the packet identifier of the additional packet to a predicted identifier to determine an identifier deviation between the packet identifier of the additional packet and a predicted identifier.

13. The system of claim 12 wherein the at least one monitoring circuit is programmed to further perform, responsive to determining that the identifier deviation between the packet identifier of the additional packet to a predicted identifier exceeds a threshold, the steps of:

receiving a plurality of packets communicated along the network; and determining whether each packet in the plurality of packets is communicated between a source and destination in a second set of network nodes, wherein the second set of network nodes comprises the first set of network nodes.

14. The system of claim 13:
wherein the first set consists of a first number of nodes; and
wherein the second set consists of a second number of nodes greater than the first set of nodes.

15. The system of claim 14 wherein the first set consists of a single source and a single destination node.

16. The system of claim 14:
wherein the single source node corresponds to a first physical sub-network and the single destination node corresponds to a second physical sub-network; and
wherein the second set comprises a plurality of source nodes corresponding to the first physical sub-network and a plurality of destination nodes corresponding to the second physical network.

17. The system of claim 13 wherein the at least one monitoring circuit is programmed to further perform, relative to each packet in the plurality of packets and determined to be communicated between a source and destination in the second set of network nodes, the step of comparing the packet identifier of each respective received packet to a predicted identifier to determine a respective identifier deviation between the packet identifier of the respective received packet and the predicted identifier.

18. The system of claim 17 wherein the at least one monitoring circuit is programmed to further perform, relative to each packet in the plurality of packets and determined to be communicated between a source and destination in a second set of network nodes, the steps of:
comparing the respective identifier deviation to a threshold; and
responsive to the respective identifier deviation exceeding a threshold, adjusting packet communications along the second set of network nodes.

19. The system of claim 18 wherein the step of adjusting packet communications along the second set of network nodes comprises adjusting packet communications at least one an edge router.

20. The system of claim 17 wherein the at least one monitoring circuit is programmed to further perform, relative to each packet in the plurality of packets and determined to be communicated between a source and destination in a second set of network nodes, the steps of:
comparing the respective identifier deviation to a threshold; and
responsive to the respective deviation exceeding a threshold, indicating an alarm.

21. The system of claim 12 wherein the at least one monitoring circuit is programmed to further perform the step of, responsive to determining the additional packet is communicated between a source and destination in the first set of network nodes, comparing a time of arrival of the additional packet to a first predicted time of arrival to determine a time deviation between the time of arrival of the additional packet and the first predicted time of arrival.

22. The system of claim 21 wherein the at least one monitoring circuit is programmed to further perform, responsive to determining that the time deviation exceeds a threshold, the steps of:

receiving a plurality of packets communicated along the network; and determining whether each packet in the plurality of packets is communicated between a source and destination in a second set of network nodes, wherein the second set of network nodes comprises the first set of network nodes.

23. The system of claim 22 wherein the at least one monitoring circuit is programmed to further perform, relative to each packet in the plurality of packets and determined to be communicated between a source and destination in a second set of network nodes, the step of comparing a time of arrival of the packet to a corresponding predicted time of arrival to determine a corresponding time deviation between the time of arrival of the packet and the corresponding predicted time of arrival.

24. The system of claim 23 wherein the at least one monitoring circuit is programmed to further perform the steps of:
comparing the corresponding time deviation to a threshold; and
responsive to the corresponding time deviation exceeding a threshold, indicating an alarm.

25. The system of claim 23 wherein the at least one monitoring circuit is programmed to further perform the steps of:
comparing the corresponding time deviation to a threshold; and
responsive to the corresponding time deviation exceeding a threshold, adjusting packet communications between at least some of the second set of nodes.

26. The system of claim 1 wherein the network comprises an internet protocol network.

27. The system of claim 1 and further comprising a plurality of monitoring circuit, each coupled to the network, and each programmed to perform the steps of:
receiving a packet communicated along the network;
determining whether the received packet is communicated between a source and destination in a first set of network nodes, wherein each packet in a sequence of communications between the source and the destination comprises a packet identifier that uniquely identifies the packet from all other communications in a flow between the source and the destination; and
responsive to determining the received packet is communicated between a source and destination in the first set of network nodes, comparing the packet identifier of the received packet to the predicted identifier to determine an identifier deviation between the packet identifier and the predicted identifier for identifying an irregularity in the network traffic.

28. A method of monitoring a network along which network traffic flows in a form of packets, the method comprising:
storing network packet information in storing circuitry, wherein the network packet information includes a predicted identifier and wherein the storing circuitry is accessible to the network; and
operating at least one monitoring circuit coupled to the network along which network traffic flows in a form of packets, the operating step comprising the steps of:
receiving a packet communicated along the network;
determining whether the received packet is communicated between a source and destination in a first set of network nodes, wherein each packet in a sequence of communications between the source and the destination comprises a packet identifier that uniquely identifies the packet from all other communications in a flow between the source and the destination;

responsive to determining the received packet is communicated between a source and destination in the first set of network nodes, comparing the packet identifier of the received packet to the predicted identifier to determine an identifier deviation between the packet identifier and the predicted identifier for identifying an irregularity in the network traffic; and comparing the identifier deviation to a threshold; and responsive to the identifier deviation exceeding a threshold, one of the steps from the group consisting of indicating an alarm and adjusting packet communications between the source and the destination.

29. The method of claim 28 wherein the packet identifier comprises a sequence number.

30. The method of claim 28, wherein the operating step further comprises, responsive to determining the received packet is communicated between a source and destination in the first set of network nodes, comparing a time of arrival of the received packet to a predicted time of arrival to determine a time deviation between the time of arrival and the predicted time of arrival.

31. The method of claim 30 wherein the operating step further comprises:

comparing the time deviation to a threshold; and responsive to the time deviation exceeding a threshold, one of the steps from the group consisting of indicating an alarm and adjusting packet communications between the source and the destination.

32. The method of claim 28 wherein the operating step further comprises, after determining that the identifier deviation between the packet identifier of the packet to a predicted identifier exceeds a threshold, the steps of:

receiving a plurality of packets communicated along the network; and determining whether each packet in the plurality of packets is communicated between a source and destination in a second set of network nodes.

33. The method of claim 32 wherein the second set of network nodes comprises the first set of network nodes and wherein the second set consists of a number of nodes greater a number of nodes in the first set of nodes.

34. The method of claim 32 wherein the operating step further comprises, relative to each packet in the plurality of packets and determined to be communicated between a source and destination in the second set of network nodes, the steps of:

comparing the packet identifier of each respective received packet to a predicted identifier to determine a respective identifier deviation between the packet identifier of the respective received packet and the predicted identifier;

comparing the respective identifier deviation to a threshold; and responsive to the respective identifier deviation exceeding a threshold, one of the steps from the group consisting of indicating an alarm and adjusting packet communications between the network.

35. A method of monitoring a network along which network traffic flows in a form of packets, the method comprising:

storing network packet information in storing circuitry, wherein the network packet information includes a predicted identifier and wherein the storing circuitry is accessible to the network; and operating at least one monitoring circuit coupled to the network along which network traffic flows in a form of packets, the operating step comprising the steps of:

receiving a packet communicated along the network;

determining whether the received packet is communicated between a source and destination in a first set of network nodes, wherein each packet in a sequence of communications between the source and the destination comprises a packet identifier that uniquely identifies the packet from all other communications in a flow between the source and the destination;

responsive to determining the received packet is communicated between a source and destination in the first set of network nodes, comparing the packet identifier of the received packet to the predicted identifier to determine an identifier deviation between the packet identifier and the predicted identifier for identifying an irregularity in the network traffic; and the operating step further comprises, after determining that the identifier deviation between the packet identifier of the packet to a predicted identifier exceeds a threshold, the steps of:

receiving a plurality of packets communicated along the network; and determining whether each packet in the plurality of packets is communicated between a source and destination in a second set of network nodes.

* * * * *